US011869104B2

(12) United States Patent
Correnti

(10) Patent No.: US 11,869,104 B2
(45) Date of Patent: *Jan. 9, 2024

(54) VISITOR-TAILORED PROPERTY CONFIGURATION

(71) Applicant: Alarm.com Incorporated, Tysons, VA (US)

(72) Inventor: Matthew Daniel Correnti, Newtown Square, PA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,062

(22) Filed: Jun. 21, 2022

(65) Prior Publication Data

US 2022/0327645 A1    Oct. 13, 2022

Related U.S. Application Data

(63) Continuation of application No. 17/007,694, filed on Aug. 31, 2020, now Pat. No. 11,393,055.

(Continued)

(51) Int. Cl.
| | |
|---|---|
| *G06Q 50/16* | (2012.01) |
| *H04N 7/18* | (2006.01) |
| *G06V 20/52* | (2022.01) |
| *G06V 40/16* | (2022.01) |
| *G06Q 50/12* | (2012.01) |

(Continued)

(52) U.S. Cl.
CPC ......... *G06Q 50/16* (2013.01); *G06F 16/9535* (2019.01); *G06Q 50/12* (2013.01); *G06Q 50/14* (2013.01); *G06V 20/53* (2022.01); *G06V 40/174* (2022.01); *H04N 7/183* (2013.01); *H04N 7/186* (2013.01)

(58) Field of Classification Search
None
See application file for complete search history.

(56) References Cited

U.S. PATENT DOCUMENTS

| | | |
|---|---|---|
| 9,197,867 B1 | 11/2015 | Scalisi et al. |
| 9,600,645 B2 | 3/2017 | Fadell et al. |
| | (Continued) | |

OTHER PUBLICATIONS

AU Examination Report in Australian Appln. No. 2020347096, dated Aug. 24, 2022, 6 pages.

(Continued)

*Primary Examiner* — David N Werner
(74) *Attorney, Agent, or Firm* — Fish & Richardson P.C.

(57) ABSTRACT

Methods, systems, and apparatus, including computer programs encoded on a storage device, are disclosed. A system includes one or more processors and one or more computer storage media storing instructions that are operable, when executed by the one or more processors, to cause the one or more processors to perform operations including: receiving data indicating that a visitor is scheduled to arrive at a property at a particular time; receiving, at the particular time and from a camera, image data; determining, based on the image data, a characteristic of the visitor; receiving, from a sensor, sensor data that indicates an attribute of the property; and based on the sensor data and on the characteristic of the visitor, selecting and performing a monitoring system action.

17 Claims, 4 Drawing Sheets

Related U.S. Application Data

(60) Provisional application No. 62/897,467, filed on Sep. 9, 2019.

(51) Int. Cl.
  *G06Q 50/14* (2012.01)
  *G06F 16/9535* (2019.01)

(56) References Cited

U.S. PATENT DOCUMENTS

| | | |
|---|---|---|
| 10,356,303 B1 | 7/2019 | Jordan, II et al. |
| 10,462,341 B1 | 10/2019 | Fu et al. |
| 11,393,055 B2* | 7/2022 | Correnti ............... G06F 16/9535 |
| 2006/0178940 A1* | 8/2006 | Taylor ................ G06Q 30/0601 705/26.1 |
| 2009/0055210 A1* | 2/2009 | Noda ..................... G06Q 10/10 705/319 |
| 2015/0109128 A1 | 4/2015 | Fadell et al. |
| 2015/0156030 A1 | 6/2015 | Fadell et al. |
| 2015/0277409 A1 | 10/2015 | Yamada |
| 2015/0310523 A1 | 10/2015 | Silvernail |
| 2015/0341603 A1 | 11/2015 | Kasmir et al. |
| 2017/0262943 A1 | 9/2017 | Akutagawa et al. |
| 2018/0349808 A1* | 12/2018 | Sahadi ................. G06Q 10/047 |
| 2018/0352378 A1* | 12/2018 | Sahadi ................. G06Q 10/047 |
| 2019/0073547 A1 | 3/2019 | el Kaliouby et al. |
| 2019/0156406 A1* | 5/2019 | Landau .................... G07C 9/30 |
| 2019/0311451 A1 | 10/2019 | Laycock et al. |
| 2022/0307844 A1* | 9/2022 | Moore ............... G01C 21/3453 |
| 2022/0337585 A1* | 10/2022 | Ishida .................. G06Q 10/025 |

OTHER PUBLICATIONS

PCT International Search Report and Written Opinion in International Application No. PCT/US2020/048785, dated Nov. 27, 2020, 10 pages.

AU Examination Report No. 3 in Australian Appln. No. 2020347096, dated Feb. 24, 2023, 6 pages.

AU Examination Report No. 2 in Australian Appln. No. 2020347096, dated Sep. 28, 2022, 5 pages.

Extended European Search Report in European Appln. No. 20863132.5, dated Sep. 8, 2022, 10 pages.

* cited by examiner

300

RECEIVE DATA INDICATING THAT A VISITOR IS SCHEDULED TO ARRIVE AT A PROPERTY AT A PARTICULAR TIME
*310*

↓

AT THE PARTICULAR TIME, RECEIVE, FROM A CAMERA, IMAGE DATA
*320*

↓

BASED ON THE IMAGE DATA, DETERMINE A CHARACTERISTIC OF THE VISITOR
*330*

↓

RECEIVE, FROM A SENSOR, SENSOR DATA THAT INDICATES AN ATTRIBUTE OF THE PROPERTY
*340*

↓

BASED ON THE SENSOR DATA AND ON THE CHARACTERISTIC OF THE VISITOR, SELECT AND PERFORM A MONITORING SYSTEM ACTION
*350*

FIG. 3

VISITOR-TAILORED PROPERTY CONFIGURATION

CROSS-REFERENCE TO RELATED APPLICATIONS

This application is a continuation of U.S. application Ser. No. 17/007,694, filed Aug. 31, 2020, now allowed, which claims the benefit of U.S. Application No. 62/897,467, filed Sep. 9, 2019. The disclosure of each of the foregoing applications is incorporated herein by reference.

TECHNICAL FIELD

This disclosure application relates generally to monitoring systems with video cameras.

BACKGROUND

Many properties are equipped with property monitoring systems that include sensors and connected system components. Some monitoring systems include indoor and outdoor video cameras.

SUMMARY

Many residents and homeowners equip their properties with monitoring systems to enhance the security, safety, or convenience of their properties. A property monitoring system can include video cameras that can obtain visual images of scenes at the property. Video cameras can be used to detect and analyze characteristics of people approaching the property.

Property monitoring systems can typically be configured for residents and/or owners of a property. For example, a property owner can configure a property monitoring system by programming a thermostat to a preferred temperature setting and by programming lighting to a preferred brightness.

When a property is listed for sale or rent, the property may be visited by visitors who are interested in purchasing or renting the property. Visitors may schedule a visit, for example, through an internet website, through a mobile application, and/or by contacting the property owner or a realtor representing the property. When the visitor visits the property at the scheduled time, it is desirable that the property appeals to the individual visitor, so that the visitor is more likely to purchase or rent the property.

Video cameras of a property monitoring system can collect images of a visitor approaching a property. The property monitoring system can analyze the images to determine characteristics of the visitor. For example, the property monitoring system can analyze the images to determine a visitor's likely age, gender, family status, and other characteristics. The property monitoring system can then tailor the property to appeal to the visitor by configuring components of the property monitoring system.

Video cameras and other sensors of a property monitoring system can also collect data while a visitor tours a property. For example, video cameras can analyze images of a visitor to determine if the visitor is responding positively or negatively to the property as a whole, and/or to specific rooms of the property. Other sensors, such as microphones, can detect a visitor's actions including speech, to determine the visitor's response to the property.

The monitoring system can generate and update a visitor profile, including the visitor's likely preferences, based on the visitor's appearance, the visitor's actions while touring the property, or both. The monitoring system can configure components of the property monitoring system to appeal to the visitor based on the visitor profile.

The techniques described can be used for properties that are for sale or rent, or in any other application in which it is desirable for a property to appeal to a specific visitor or group of visitors. For example, a business owner may own a commercial property with a property monitoring system. The business owner may host a meeting with an important client at the commercial property. At the time of the meeting, the property monitoring system can analyze images of the client in order to tailor the property to appeal to the client.

According to an innovative aspect of the subject matter described in this application, a monitoring system for monitoring a property includes one or more processors and one or more computer storage media storing instructions that are operable, when executed by the one or more processors, to cause the one or more processors to perform operations. The operations include receiving data indicating that a visitor is scheduled to arrive at a property at a particular time; receiving, at the particular time and from a camera, image data; determining, based on the image data, a characteristic of the visitor; receiving, from a sensor, sensor data that indicates an attribute of the property; and based on the sensor data and on the characteristic of the visitor, selecting and performing a monitoring system action.

Other embodiments of this and other aspects include corresponding systems, apparatus, and computer programs, configured to perform actions of methods encoded on computer storage devices. A system of one or more computers or other processing devices can be so configured by virtue of software, firmware, hardware, or a combination of them installed on the system that in operation cause the system to perform the operations. One or more computer programs can be so configured by virtue having instructions that, when executed by data processing apparatus, cause the apparatus to perform the operations.

These and other embodiments may each optionally include one or more of the following features, alone or in any combination. In some implementations, selecting and performing the monitoring system action includes classifying, based on the characteristic of the visitor, the visitor into a category of visitors; identifying property settings preferred by the category of visitors; determining, based on the sensor data, that a property setting is different from the property settings preferred by the category of visitors; and adjusting the property setting to align the property setting with the property settings preferred by the category of visitors.

In some implementations, identifying the property settings preferred by the category of visitors includes accessing a database of property settings preferred by multiple categories of visitors.

In some implementations, the operations include: receiving, from a second sensor at the property, second sensor data indicating a reaction of the visitor to the property; and storing, in the database of property settings, the property setting and the data indicating the reaction of the visitor to the property.

In some implementations, the operations include: receiving, through a user interface presented to the visitor by a computing device, user input data indicating a reaction of the visitor to the property; and storing, in the database of property settings, the property setting and the user input data indicating the reaction of the visitor to the property.

In some implementations, selecting and performing the monitoring system action includes: determining, based on the characteristic of the visitor, a likely preference of the visitor; determining that the sensor data indicates an attribute of the property that is different from the likely preference of the visitor; and based on determining that the sensor data indicates the attribute of the property that is different from the likely preference of the visitor, adjusting the attribute of the property to align the attribute of the property with the likely preference of the visitor.

In some implementations, determining the likely preference of the visitor includes: providing the characteristic of the visitor as input to a machine learning model that has been trained to determine likely preferences corresponding to visitor characteristics; receiving an output from the machine learning model that indicates the likely preference of the visitor; and determining, based on the received output from the machine learning model, the likely preference of the visitor.

In some implementations, the visitor includes a first visitor. The operations include determining, based on the image data, a characteristic of a second visitor and determining, based on the characteristic of the second visitor, a likely preference of the second visitor that is different from the likely preference of the first visitor. Selecting and performing a monitoring system action includes: classifying the first visitor as a lead visitor; determining that the sensor data indicates an attribute of the property that is different from the likely preference of the first visitor and is different from the likely preference of the second visitor; and based on determining that the sensor data indicates the attribute of the property that is different from the likely preference of the first visitor and is different from the likely preference of the second visitor, and in response to classifying the first visitor as the lead visitor, adjusting the attribute of the property to align the attribute of the property with the likely preference of the first visitor.

In some implementations, the operations include: based on the data indicating that the visitor is scheduled to arrive at the property at the particular time, retrieving, at or before the particular time, and from a database of visitor profiles, a stored profile for the visitor.

In some implementations, the operations include: determining, based on the image data and the stored profile, that a person arriving at the property at or near the particular time is the visitor.

In some implementations, the stored profile for the visitor includes data indicating at least one of: a preference of the visitor; demographic information of the visitor; or a reaction of the visitor to a property previously visited by the visitor.

In some implementations, the operations include adding, to the stored profile for the visitor, the characteristic of the visitor.

In some implementations, the operations include generating a profile of the visitor including the characteristic of the visitor and storing the profile of the visitor in a database of visitor profiles.

In some implementations, the operations include determining, based on the image data, a characteristic of a group of visitors that includes the visitor and at least one other visitor; and based on the sensor data and on the characteristic of the group of visitors, selecting and performing the monitoring system action.

In some implementations, selecting and performing the monitoring system action includes: classifying, based on the characteristic of the group of visitors, the group into a category of groups; identifying property settings preferred by the category of groups; determining, based on the sensor data, that a property setting is different from the property settings preferred by the category of groups; and adjusting the property setting to align the property setting with the property settings preferred by the category of groups.

In some implementations, the operations include: receiving, from a second monitoring system of a second property, data representing an interaction of the visitor with the second property; determining, based on the data representing the interactions of the visitor with the second property, a likely preference of the visitor; and based on the likely preference of the visitor, performing the monitoring system action.

In some implementations, the characteristic of the visitor includes one or more of an age, gender, apparel, accessory, or mode of transportation of the visitor.

In some implementations, the attribute of the property includes one or more of a status of an appliance, a lighting level, a sound level, a temperature, or a scent at the property.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow chart illustrating an example of a process for visitor-tailored property control and configuration.

Like reference numbers and designations in the various drawings indicate like elements.

DETAILED DESCRIPTION

Figure 1:
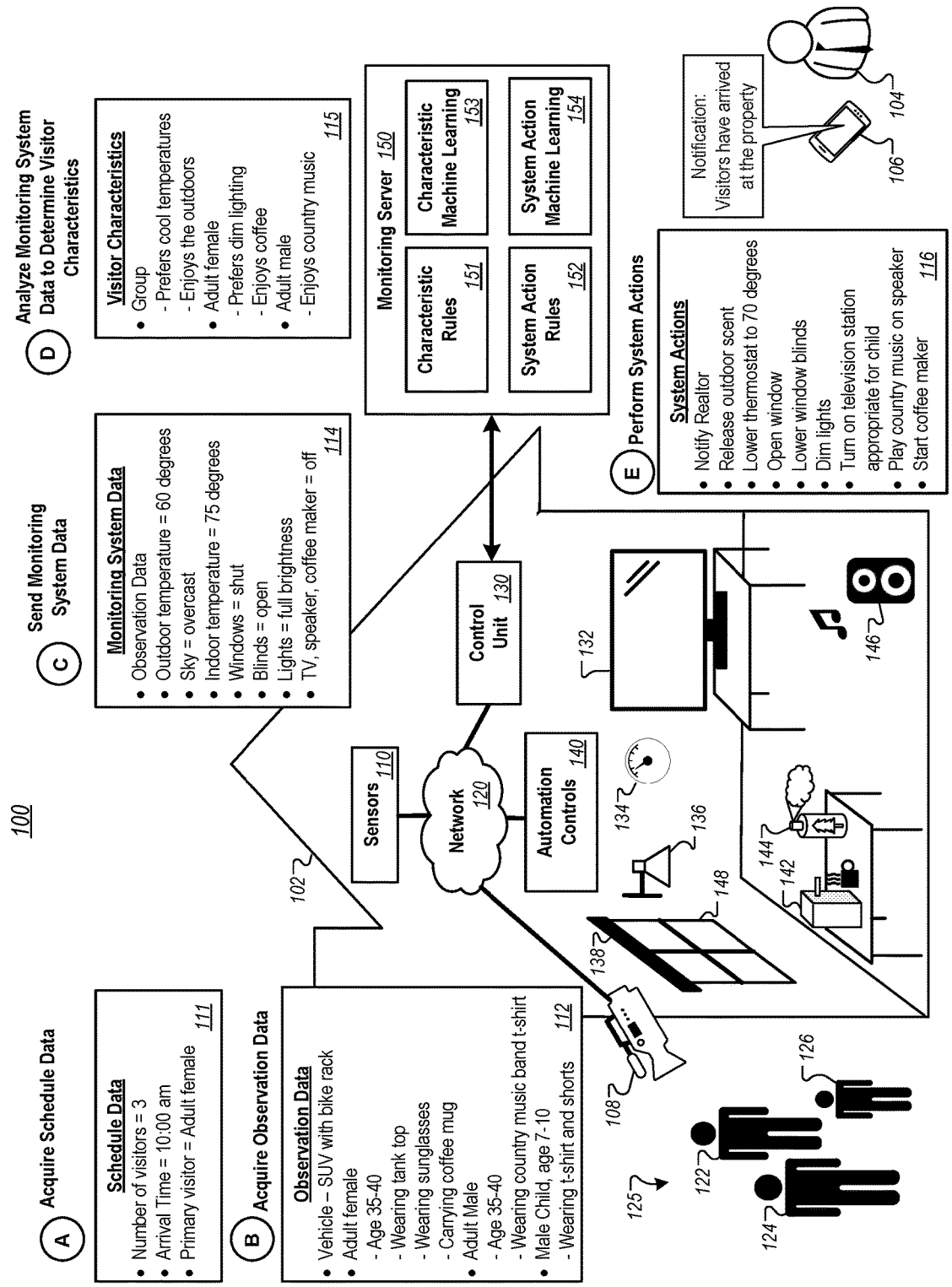
FIG. 1 is a diagram illustrating an example system for visitor-tailored property control and configuration based on video image data.

FIG. 1 is a diagram illustrating an example system 100 for visitor-tailored property control and configuration based on video image data. A property 102 is monitored by a monitoring system. The property 102 can be a home, another residence, a place of business, a public space, or another facility that is monitored by a monitoring system. In the example in FIG. 1, the property 102 is property that is on the market for sale or lease. The property 102 may be visited by visitors who are considering purchasing or renting the property 102.

The property 102 is represented by a realtor 104. The realtor 104 can receive notifications and alerts regarding the property 102 via communication from a monitoring server 150 to a mobile device 106. The mobile device 106 can be, for example, a laptop computer, a tablet, or a smart watch.

The monitoring system at the property 102 includes a local network 120. The network 120 can be any communication infrastructure that supports the electronic exchange of data between a control unit 130 and other components of the monitoring system. For example, the network 120 may include a local area network (LAN). The network 120 may be any one or combination of wireless or wired networks and may include any one or more of Ethernet, Bluetooth, Bluetooth LE, Z-wave, Zigbee, or Wi-Fi technologies.

The monitoring system includes one or more sensors 110 located at the property 102 that collect sensor data related to the property 102. The monitoring system has the ability to control various sensors 110 and other devices on the property 102 through automation controls 140. Example sensors 110 can include thermometers, cameras, microphones, smoke detectors, and water flow sensors. The control unit 130 can collect and assess data from the sensors 110 to monitor the conditions of the property 102 and detect any anomalies.

The automation controls 140 can include automation controls 140 for various devices and appliances at the property 102. For example, automation controls 140 can include controls for televisions 132, thermostats 134, lights 136, window blinds 138, windows 148, coffee makers 142, air fresheners 144, and/or speakers 146.

An example sensor 110 at the property 102 is an outdoor video camera 108. The video camera 108 may be used to monitor for visitors approaching the property 102. The video camera 108 can be any kind of image capturing device. In some examples, the video camera incorporates multiple types of sensors. For example, the video camera 108 can include one or more of the following: a visual camera, a thermal camera, and a motion sensor. In some examples, the video camera 108 continuously collects images. In some examples, the video camera 108 collects images when triggered by a sensor, e.g., a motion sensor.

In some examples, video cameras may be positioned in common areas that may be near the property 102. For example, the property 102 may be an apartment at an apartment complex. One or more video cameras may be positioned in a location such as a leasing office of the apartment complex. The monitoring system may include the video cameras in the leasing office in addition to, or instead of, the video camera 108 located at the property 102.

The video camera 108 may include an embedded computer with video analytics software. The video analytics software can use image segmentation or other computer vision technology to perform video analysis on images captured by the video camera 108. In some implementations, the video camera 108 may transmit images to the control unit 130, and the control unit 130 may perform video analysis on the images. In some implementations, the control unit 130 transmits images to the monitoring server 150, and the monitoring server 150 performs video analysis on the images. The video camera 108, the control unit 130, and/or the monitoring server 150 may perform video analysis on the images to detect and identify objects and/or perform facial recognition within the field of view of the video camera 108. For example, the video camera 108, control unit 130, and/or monitoring server 150 may detect and identify people, animals, and/or vehicles at the property 102.

The control unit 130 can be, for example, a computer system or other electronic device configured to communicate with the sensors 110. The control unit 130 can also perform various management tasks and functions for the monitoring system. In some implementations, the realtor 104, a resident, or another user can communicate with the control unit 130 (e.g., input data, view settings, or adjust parameters) through a physical connection, such as a touch screen or keypad, through a voice interface, or over a network connection.

The monitoring server 150 can be, for example, one or more computer systems, server systems, or other computing devices that are located remotely from the property 102 and that are configured to process information related to the monitoring system at the property 102. In some implementations, the monitoring server 150 is a cloud computing platform.

The control unit 130 communicates with the monitoring server 150 via a long-range data link. The long-range data link can include any combination of wired and wireless data networks. For example, the control unit 130 can exchange information with the monitoring server 150 through a wide-area-network (WAN), a broadband internet connection, a cellular telephony network, a wireless data network, a cable connection, a digital subscriber line (DSL), a satellite connection, or other electronic means for data transmission. In some implementations, the long-range data link between the control unit 130 and the monitoring server 150 is a secure data link (e.g., a virtual private network) such that the data exchanged between the control unit 130 and the monitoring server 150 is encoded to protect against interception by an adverse third party.

In stage (A) of FIG. 1, the monitoring system acquires schedule data 111. The schedule data 111 includes an estimated time that a visitor or group of visitors is expected to arrive. The schedule data 111 includes an estimated time of arrival of 10:00 am.

In some examples, the schedule data 111 can include specific properties out of multiple properties that the visitor is scheduled to visit. For example, an apartment complex may include multiple apartments available for rent. The schedule data 111 can include the one or more of the multiple apartments that the visitor is scheduled to visit.

The schedule data 111 can include information provided by, for example, a realtor or leasing agent. For example, a leasing agent may provide information indicating specific properties out of multiple properties that the visitor requests to visit. The leasing agent may input the information to the monitoring system through, e.g., a mobile application or internet website.

The schedule data 111 can include information provided by a visitor in advance of the visit, e.g., information provided when scheduling the visit through an internet website or mobile application. A visitor may provide information that can include, for example, the number of visitors, photographs of visitors, visitors' names, ages, genders, and/or family status.

The schedule data 111 indicates that the visitor who scheduled the visit is an adult female. The adult female provided information that she is visiting with a group of three visitors, including a husband and son. Based on the adult female scheduling the visit on behalf of the group, the monitoring system may identify the adult female to be the primary visitor of the group. The monitoring system can identify the primary visitor as the leader of the group and/or the visitor within the group who is most likely to make decisions regarding purchasing and/or renting the property 102.

In stage (B) of FIG. 1, the monitoring system acquires observation data 112. At or near the scheduled time of arrival, the video camera 108 collects images of a group 125 of visitors. The group 125 includes three visitors 122, 124, 126. The video camera 108 performs video analysis of the images using embedded video analytics software. The video camera 108 sends the observation data 112 to the control unit 130 over the network. The observation data 112 includes the results of the video analysis of the images.

The observation data 112 can include information related to the group's method of transportation to the property 102. The video camera 108 determines that the group 125 arrived at the property 102 in a sports utility vehicle and that the sports utility vehicle has an attached bicycle rack.

The observation data 112 can include information related to the appearance of each visitor of the group 125. For example, the observation data 112 includes information regarding the appearance of the visitor 122, based on video analysis. The observation data 112 for the visitor 122 indicates that the visitor 122 is an adult female between the ages of 35 and 40. The video camera 108 determines that the visitor 122 is wearing a tank top and sunglasses and that the visitor 122 is carrying a coffee mug.

The observation data 112 for the visitor 124 indicates that the visitor 124 is an adult male between the ages of 35 and 40. The video camera 108 determines that the visitor 124 is wearing a t-shirt with a logo for a country music band.

The observation data 112 for the visitor 126 indicates that the visitor 126 is a male child between the ages of seven and ten. The video camera 108 determines that the visitor 126 is wearing a t-shirt and shorts.

The control unit 130 receives the observation data 112. The control unit 130 may analyze, sort, and/or filter the data. In some examples, the video camera 108 can send video images to the control unit 130 and the control unit 130 can perform video analysis on the video images. The control unit 130 receives additional sensor data from other sensors 110 of the property 102. For example, the control unit 130 can receive data related to the configurations of various appliances and components of the monitoring system at the property 102.

In stage (C) of FIG. 1, the control unit 130 sends monitoring system data 114 to the monitoring server 150. The monitoring system data 114 can include the observation data 112 indicating the arrival of the group 125 and the appearance of the group 125, based on video analysis.

The monitoring system data 114 can include additional sensor data from the sensors 110. The monitoring system data 114 includes the indoor and outdoor temperature at the property 102 as measured by thermometers. The indoor temperature is 75 degrees, while the outdoor temperature is 60 degrees. The monitoring system data 114 includes current weather data at the property 102, including data indicating that the sky is overcast.

The monitoring system data 114 can include the status and/or configurations of various components of the monitoring system. For example, the monitoring system data 114 can include data from a window sensor indicating that the window 148 is shut, and data from a window blind controller indicating that the window blinds 138 are open. The monitoring system data 114 can include data from a light sensor indicating that the lights 136 are set to full brightness. The monitoring system data 114 can also include the on/off status of various appliances. For example, the monitoring system data 114 can include data indicating that the television 132, speaker 146, and coffee maker 142 are off.

In stage (D) of FIG. 1, the monitoring server 150 analyzes the monitoring system data 114 to determine visitor characteristics 115. The monitoring system data 114 can correlate the observation data 112 with the schedule data 111, including any information previously provided by the primary, or lead, visitor. For example, the schedule data 111 includes that the primary visitor is an adult female. The observation data 112 includes information regarding the appearance of the visitor 122, based on video analysis. The observation data 112 for the visitor 122 indicates that the visitor 122 is an adult female. Therefore, the monitoring server 150 can determine that the visitor 122 is the primary visitor. Similarly, based on correlating the observation data 112 with the schedule data 111, the monitoring server 150 can determine that the visitor 124 is likely the primary visitor's husband, and the visitor 126 is likely the primary visitor's son.

Visitor characteristics 115 can include likely preferences of the visitors, based on the monitoring system data 114. For example, visitor characteristics 115 can include visitors' likely preferences related to temperature, lighting, scent, and sound.

The monitoring server 150 can analyze the monitoring system data 114 to determine visitor characteristics 115 of the group 125 as a whole. For example, each visitor within the group 125 is lightly dressed. The visitors 124 and 126 are wearing t-shirts, while the visitor 122 is wearing a tank top. The monitoring system data 114 indicates that the outdoor temperature is 60 degrees. Thus, the monitoring server 150 may determine that the group 125 likely prefers cooler temperatures. Additionally, the group 125 arrives at the property 102 in a sports utility vehicle with a bicycle rack. The monitoring server 150 can analyze the data related to the group's transportation and determine that the group 125 likely enjoys spending time outdoors.

The monitoring server 150 can analyze the monitoring system data 114 to determine visitor characteristics 115 of the individual visitors 122, 124, 126 within the group 125. For example, the observation data 112 indicates that the visitor 122 is wearing sunglasses. The monitoring system data 114 indicates that the sky is overcast. The monitoring server 150 can determine that the visitor 122 likely prefers dim lighting. The visitor 122 is also carrying a coffee mug. The monitoring server 150 can determine that the visitor 122 likely enjoys the taste and scent of coffee. Similarly, the visitor 124 is wearing a country music band t-shirt. The monitoring server 150 can determine that the visitor 124 enjoys the sounds of country music.

In some examples, the monitoring server 150 can determine visitor characteristics 115 based on pre-programmed characteristic rules 151. For example, a characteristic rule 151 may state that a visitor wearing a coat when the outdoor temperature is above 65 degrees prefers warm temperatures. In another example, characteristic rules 151 may state that female visitors prefer floral scents, while male visitors prefer fruity scents.

In some examples, the monitoring server 150 can determine visitor characteristics 115 using a characteristic machine learning algorithm 153. For example, the monitoring server 150 can collect data from visitors of multiple properties over time. The monitoring server 150 can monitor visitors' reactions to various temperatures, sounds, lighting, and scents. In some examples, the monitoring server 150 can monitor visitors' reactions by collecting image and/or audio data from the properties. The monitoring server 150 can analyze images of a visitor and/or audio data from a visitor's speech to determine if the visitor has a positive reaction or a negative reaction to the property. The monitoring server 150 can update the characteristic machine learning algorithm 153 based on analyzing visitor responses to the various temperatures, sounds, lighting, and scents.

In stage (E) of FIG. 1, the monitoring server 150 selects and performs system actions 116. System actions 116 can include, for example, sending a command to the control unit 130 to configure a device at the property 102 through automation controls 140. System actions 116 can also include sending a notification, e.g., to the mobile device 106 of the realtor 104.

In some examples, the monitoring server 150 selects and performs system actions 116 in specific properties, out of multiple properties, that the group 125 is scheduled to visit. For example, based on observation data 112 from a video camera in a leasing office of an apartment complex, and schedule data 111 including the specific apartments that the visitor is scheduled to visit, the monitoring server 150 may select and perform system actions 116 in only those specific apartments.

In some examples, the monitoring server 150 can select system actions 116 based on pre-programmed system action rules 152. The system action rules 152 may be set by, for example, an installer or operator of the property monitoring system. For example, a system action rule 152 may state that the monitoring server 150 sends a notification to the realtor 104 when visitors first arrive at the property 102. In some examples, a system action rule 152 may state that if a group of visitors includes a child under the age of twelve, the monitoring server 150 sends a command to the control unit 130 to turn on the television 132 to a television program appropriate for children.

In some examples, the monitoring server 150 can select system actions 116 using a system action machine learning algorithm 154. For example, the monitoring server 150 can collect data from visitors of multiple properties over time. The monitoring server 150 can configure devices at the properties, and can monitor visitors' reactions to the various device configurations. In some examples, the monitoring server 150 can monitor visitors' reactions by collecting image and/or audio data from the properties. The monitoring server 150 can analyze images of a visitors and/or audio data from a visitor's speech to determine if the visitor has a positive reaction or a negative reaction to the property.

In some examples, the monitoring server 150 can monitor visitors' reactions to a property by receiving feedback directly from the visitors, e.g., through a post-visit survey. The monitoring server 150 can update and improve the system action machine learning algorithm 154 over time, based on reactions from multiple visitors at multiple properties.

In some examples, the monitoring server 150 can evaluate visitors' reactions to a property based on property sale data. For example, the monitoring server 150 can receive public data related to the speed of sale and the price of sale of various properties that were tailored based on visitor preferences. The monitoring server 150 can update and improve the system action machine learning algorithm 154 over time, based on analyzing the property sale data.

In some examples, the monitoring server 150 can determine system actions 116 based on prioritizing the likely preferences of the primary visitor over the likely preferences of other visitors. For example, the visitor 122 is wearing sunglasses on an overcast day. The monitoring server 150 determines that the visitor 122 likely prefers dim lighting. The visitors 124, 126 are not wearing sunglasses. The monitoring server 150 determines that the visitors 124, 126 likely do not prefer dim lighting. The monitoring server 150 may prioritize the preferences of the visitor 122, because the visitor 122 is the primary visitor. Thus, if there is a conflict between the preferences of visitors within the group 125, the monitoring server 150 can determine system actions 116 based on the likely preferences of the visitor 122.

The monitoring server 150 performs the system actions 116 based on the analysis of the monitoring system data 114 and the visitor characteristics 115. For example, based on the arrival of the group 125, the monitoring server 150 sends a notification to the realtor 104. The monitoring server 150 can send the notification to the realtor 104 via, for example, an email that the realtor 104 can receive on the mobile device 106. The monitoring server 150 can also send the notification to the realtor 104 via, for example, a text message or telephone call.

The monitoring system data 114 includes data indicating that the indoor temperature is 75 degrees. Based on the visitor characteristic 115 that the group 125 likely prefers cooler temperatures, the monitoring server 150 sends a command to the control unit 130 to reduce the thermostat 134 temperature to 70 degrees. Based on the visitor characteristic 115 that the group 125 likely enjoys spending time outdoors, the monitoring server 150 sends a command to the control unit 130 to activate the air freshener 144 to release an outdoor scent using automation controls 140. Based on the visitor characteristics 115 that the group 125 both prefers cooler temperatures and enjoys spending time outdoors, the monitoring server 150 sends a command to open the windows 148.

The monitoring server 150 performs certain system actions 116 based on the likely preferences of individual visitors within the group 125. For example, based on the visitor characteristic 115 that the visitor 122 likely prefers dim lighting, the monitoring server 150 sends a command to lower the window blinds 138 and dim the lights 136. Based on the visitor characteristic 115 that the visitor 122 likely enjoys coffee, the monitoring server 150 sends a command to turn on the coffee maker 142. Based on the observation data 112 that the visitor 126 is a child between the ages of 7 and 10, the monitoring server 150 sends a command to turn on the television 132 to an age-appropriate program. Based on the visitor characteristic 115 that the visitor 124 likely enjoys country music, the monitoring server 150 sends a command to play country music on the speaker 146. In some examples, the monitoring server 150 can select to play certain country music songs based on the age of the visitor 124, determined from the observation data 112. For example, the monitoring server 150 may select to play country music songs that were popular approximately during the time when the visitor 124 was a young adult.

In some examples, system actions 116 can include displaying information related to the property 102 and/or the neighborhood for the group 125 to view. For example, the property may include a display screen or a device that can display an electronic pamphlet. The monitoring system can configure the pamphlet to display information based on the likely preferences of the group 125. For example, the group 125 is a family with a young child. Therefore, the monitoring system may select to configure the pamphlet to display information related to family friendly amenities, e.g., nearby schools and parks. If a visitor or group of visitors are young adults, the monitoring system may select to configure the pamphlet to display information related to, for example, local restaurants and nightlife.

In some examples, system actions 116 can include adjusting configurable furniture. Configurable furniture may be, for example, motorized and/or robotic furniture that can be adjusted by the monitoring system. An example of configurable furniture may be a set of shelves that can be adjusted to expand into a closet. In another example, configurable furniture can include a sofa that can be adjusted to expand into a bed. The monitoring system can adjust the configurable furniture based on the likely preferences of the group 125. For example, observation data 112 may indicate that the visitor 122 is wearing fashionable clothing. The monitoring server 150 can determine that closet space is likely important to the visitor 122. Therefore, the monitoring system may select to adjust a configurable set of shelves to expand into a closet. In another example, the monitoring system can adjust configurable furniture to protect fragile items and/or decorations. For example, based on the group 125 including the child visitor 126, the monitoring system can raise configurable shelves containing fragile items to a height that the visitor 126 cannot reach.

In some examples, the monitoring system can coordinate system actions 116 based on a theme or mood. For example, the monitoring system may determine that a primary visitor of a group of visitors enjoys calm activities and calm music. The monitoring system can coordinate system actions 116 to tailor the entire property to the primary visitor based on a calm theme or mood. For example, the monitoring system can play meditation music through a speaker, dim the lighting, and turn off the television. The monitoring system may select to configure the entire property based a calm theme, even if analysis of additional visitors indicates that their preferences conflict with those of the primary visitor.

In some examples, the monitoring server 150 can perform the system actions 116 before the group 125 enters the property 102. For example, the monitoring server 150 can perform the system actions 116 while the group 125 walks up to the front door of the property 102. When the group 125 enters the property 102, the property monitoring system may already be tailored for the group 125.

Though described above as being performed by a particular component of system 100 (e.g., the control unit 130 or the monitoring server 150), any of the various control, processing, and analysis operations can be performed by either the control unit 130, the monitoring server 150, or another computer system of the system 100. For example, the control unit 130, the monitoring server 150, or another computer system can analyze the data from the sensors 110 to determine the system actions 116. Similarly, the control unit 130, the monitoring server 150, or another computer system can control the various sensors 110, and/or the property automation controls 140, to collect data or control device operation.

Figure 2:
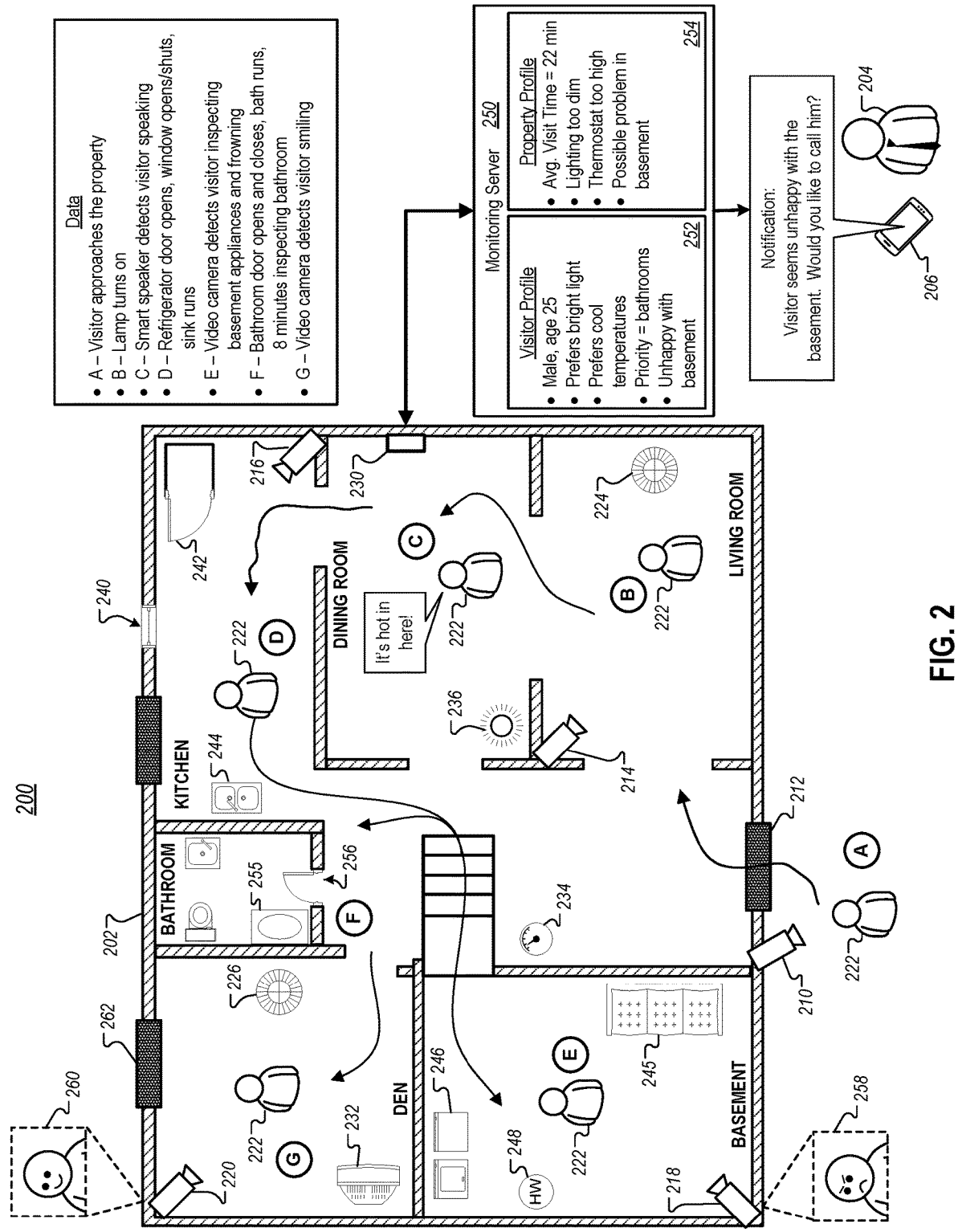
FIG. 2 is a diagram illustrating an example system for visitor-tailored property control and configuration based on visitor interaction.

FIG. 2 is a diagram illustrating an example system 200 for visitor-tailored property control and configuration based on visitor interaction. The system 200 includes a property 202 that is monitored by monitoring system and is available for sale or rent. The monitoring system for the property 202 can collect data related to visitor actions at the property 202. For example, the monitoring system can collect information related to visitor interaction with devices and appliances at the property 202 as the visitor tours the property 202. The property 202 is represented by a realtor 204. The realtor 204 can receive notifications and information related to the property 202 from a monitoring server 250, including information related to visitor actions at the property 202.

The property monitoring system includes sensors. Example sensors can include video cameras. Video cameras can be located indoors and outdoors. For example, video camera 210 is located outdoors, near a front door 212. Video camera 214 is located in a living room, video camera 216 is located in a kitchen, video camera 218 is located in a basement, and video camera 220 is located in a den. Additional sensors can include water flow sensors. For example, water flow sensors may be installed to detect a flow of water to and from plumbing fixtures, e.g., sinks, toilets, and bathtubs. Sensors can also include appliance monitors that can determine if appliances are turned on or off. Example sensors can also include door and window sensors that can determine if windows and/or doors of the property 202 are open or shut.

Similar to the monitoring system of the property 102, the sensors of the property 202 communicate with a control unit 230 over a local network. The control unit 230 communicates with a monitoring server 250 over a long-range data link.

The monitoring server 250 may include a visitor profile 252 for visitors to the property 202. In some examples, the monitoring server 250 includes a visitor profile 252 for each individual visitor to the property 202. In some examples, the monitoring server 250 may include a group profile for each group of visitors to the property 202, where a group of visitors is a collection of multiple visitors who visit the property 202 together at the same time. In some examples, the monitoring server 250 may include both a group profile for each group of visitors, and an individual profile for each individual visitor.

In some examples, the monitoring server 250 creates a visitor profile 252 when a visitor schedules a visit to the property 202. The visitor profile 252 can include any information provided by the visitor when scheduling the visit. For example, the visitor profile 252 can include the visitor's name, age, and gender. In some examples, the monitoring server 250 creates a visitor profile 252 when the visitor arrives at the property 202. The monitoring server 250 may add data to the visitor profile 252 as the visitor tours and interacts with the property 202. In some examples, the visitor profile 252 can include data collected from previous visits to the property 202 or to another property. For example, a certain visitor may visit a property more than one time, and/or may visit multiple properties. Each time the visitor visits a property with a monitoring system that communicates with the monitoring server 250, the monitoring server 250 can update the visitor profile with data collected during the visit.

The visitor profile 252 can include data including visitor actions at the property 102. The visitor profile 252 can include visitor preferences based on analysis by the monitoring server 250. For example, the visitor profile 252 can include a visitor's preferences for temperature, lighting, scent, and sound. The monitoring server 250 can update the visitor profile 252 when new data is collected.

The monitoring server 250 may include a property profile 254 for the property 202. The property profile 254 may include data collected from one or more visitors to the property 202. For example, at a certain property, many visitors may depart from the property immediately after touring the basement. The monitoring server 250 can update the property profile 254 each time a visitor departs the property. The monitoring server 250 can analyze the data of the property profile 254 and determine that there is a trend of visitors departing the property after touring the basement. Based on this determination, the monitoring server 250 can take a system action, e.g., by notifying a realtor representing the property that there may be a problem with the basement.

In stage (A) of FIG. 2, a visitor 222 approaches the property 202. The visitor may have scheduled a visit in advance, e.g., through an internet website or mobile application. If the visitor scheduled the visit in advance, the monitoring server 250 may already have a visitor profile 252 for the visitor 222. If the visitor did not schedule the visit in advance, the monitoring server 250 may create a visitor profile 252 for the visitor 222 upon arrival.

The video camera 210 collects images of the visitor 222 outside of the property 202. The monitoring server 250 analyzes the images of the visitor 222. In some examples, the monitoring server 250 correlates the images of the visitor 222 with an existing visitor profile 252. For example, the visitor 222 may have a visitor profile 252 indicating that he is a 25 year old male. When the visitor 222 arrives at the property 202, the monitoring server 250 confirms through video analysis that the visitor 222 is an adult male in his twenties. The monitoring server 250 can then add data collected from the sensors at the property 202 to the visitor profile 252 of the visitor 222. For example, if the visitor 222 arrives at the property with a young child, the monitoring server 250 may determine that the visitor 222 is likely a parent of the child. The monitoring server 250 can add the determination that the visitor 222 is likely the parent of the child to the visitor profile 252.

As described in reference to FIG. 1, the monitoring system can analyze the image data from the video camera 214 and take system actions based on the observation data of the visitor 222, before the visitor 222 enters the property 202. For example, the monitoring system may dim or brighten lights, activate air fresheners, and/or play music based on the observation data of the visitor 222. The monitoring system may turn on the television 232 to a television program that the visitor 222 is likely to enjoy. The monitoring system may also adjust configurable furniture based on the likely preferences of the visitor 222. For example, based on the visitor 222 being an adult male in his twenties, the monitoring server 150 may determine that the visitor 222 likely prefers open spaces for hosting parties and gatherings. The monitoring system may then adjust configurable furniture to reduce the amount of furniture-occupied floor space at the property 202. For example, the monitoring system may adjust an expandable bed to contract into a sofa 245.

In stage (B) of FIG. 2, the visitor 222 enters the living room. The living room includes the video camera 214. The video camera 214 can collect images of the actions of the visitor 222 in the living room. The living room has a lamp 224 that is initially off. The visitor 222 turns the lamp 224 on. The video camera 214 collects images of the visitor turning the lamp 224 on. Additionally, an appliance monitor connected to the lamp 224 detects that the lamp 224 turns on. The video camera 214 and the appliance monitor send data to the control unit 230 indicating that the visitor 222 turned the lamp 224 on. Based on the visitor 222 turning the lamp 224 on, the control unit 230 may determine that the property 202 is too dark for the visitor's preferences. The control unit 230 can send a command to turn on other lamps at the property, e.g., the lamp 226, located in the den.

The control unit 230 sends data to the monitoring server 250 indicating that the visitor 222 turned on the lamp 224. The monitoring server 250 can add the data to the visitor profile 252 and to the property profile 254. Based on the data indicating that the visitor 222 turned on the lamp 224, the monitoring server 250 may determine that the visitor 222 likely prefers bright lighting. If other visitors also turn on the lamp 224 after entering the property 202, the monitoring server 250 may determine that the living room is too dimly lit for visitors' preferences.

In stage (C) of FIG. 2, the visitor 222 enters the dining room. The dining room includes a smart speaker 236. The smart speaker 236 can detect speech of the visitor 222 and perform actions in response to the speech. The smart speaker 236 detects the visitor 222 saying "It's hot in here!" In some examples, the smart speaker 236 may interpret the speech and respond by performing an action, e.g., by sending a command through the network to the thermostat 234 to reduce the temperature of the property 202. In some examples, the smart speaker 236 may send data representing the visitor's speech to the control unit 130. The control unit 130 and/or the monitoring server 250 can interpret the visitor's speech and determine to send a command to lower the thermostat 234 in response. The monitoring server 250 can also store the data in the visitor profile 252, indicating that the visitor 222 likely prefers cooler temperatures, and in the property profile 254, indicating that the thermostat 234 at the property 202 may be set too high.

In stage (D) of FIG. 2, the visitor 222 enters the kitchen. The kitchen includes the video camera 216. The video camera 216 detects the visitor 222 opening and shutting a door of a refrigerator 242, opening and shutting a window 240, and running a faucet of a sink 244. An appliance monitor may also detect the door of the refrigerator 242 opening and shutting. A window sensor may detect the window 240 opening and shutting, and a water flow sensor may detect the sink 244 running. The video camera 216, appliance monitor, window sensor, and water flow sensor can send data related to the visitor's actions in the kitchen to the monitoring server 250 via the control unit 230. The monitoring server 250 can add the data to the visitor profile 252. The data collected from the kitchen sensors may indicate that the visitor 222 is concerned with the functionality of appliances and fixtures of the property 202. The data collected from the kitchen may also indicate the level of seriousness of the visitor 222 in considering purchasing the property 202. For example, a visitor who is not seriously considering purchasing a property might walk through quickly. The visitor 222 is operating and inspecting appliances and fixtures of the property 202, which may indicate that the visitor 222 can be considered a serious prospective buyer.

In stage (E) of FIG. 2, the visitor 222 enters the basement. The basement includes the video camera 218. The video camera 218 detects the visitor 222 inspecting laundry machines 246 and a water heater 248. The video camera 218 collects an image 258 of the visitor's face. The video camera 218 performs facial expression recognition on the image 258 to determine the visitor's facial expressions using video analytics software. The video camera 218 determines that the visitor 222 is frowning. The video camera 218 can send the image 258 and/or data indicating that the visitor 222 is frowning to the monitoring server 250 via the control unit 230. In response to receiving data indicating that the visitor 222 is frowning in the basement, the monitoring server 250 may perform a system action. For example, the monitoring server 250 may send a notification to the mobile device 206 of the realtor 204. The notification may state that the visitor 222 appears to be unhappy with the basement. The notification may prompt the realtor 204 to call the visitor 222 to ask how the visitor's experience is going. The realtor 204 may then be able to remedy any problems that the visitor 222 is having.

In stage (F) of FIG. 2, the visitor 222 enters the bathroom. A door sensor may detect the door 256 opening when the visitor 222 enters, and closing when the visitor 222 departs, the bathroom. Water flow sensors may detect water flowing from a plumbing fixture in the bathroom, such as a bathtub 255. The door sensor can send data to the monitoring server 250 indicating that the visitor 222 spent eight minutes inspecting the bathroom. A longer duration of time may indicate that the visitor 222 performed a thorough inspection of the bathroom. Water flow sensor data indicating that the visitor 222 operated all of the fixtures in the bathroom can confirm that the visitor 222 performed a thorough inspection, which can indicate that bathrooms are a priority for the visitor 222. The monitoring server 250 can add the data related to the visitor's interaction with bathroom fixtures, and time spent inspecting the bathroom, to the visitor profile 252.

In stage (G) of FIG. 2, the visitor 222 enters the den. The den includes the video camera 220. The den also includes a door 262 to a backyard. When the visitor 222 enters the den, the television 232 is displaying a television program and the lamp 226 is on. The video camera 220 can collect images of the visitor 222 in the den. The video camera 220 collects an image 260 of the visitor's face. The video camera 220 performs facial expression recognition on the image 260 and determines that the visitor 222 is smiling. The video camera 220 can send the image 260 and/or data indicating that the visitor 222 is smiling to the monitoring server 250 via the control unit 130. In response to receiving data indicating that the visitor 222 is smiling in the den, the monitoring server 250 can store the data in the visitor profile 252. The data may indicate that the visitor 222 is happy with the lighting level and/or the television program in the den. The data may also indicate that the visitor 222 is happy with the backyard of the property 202 as seen through the door 262.

As the visitor 222 progresses through the property, the monitoring server can update the visitor profile 252, the property profile 254, or both, with information related to the amount of time spent in each room, and the amount of total time spent at the property 202. The amount of time spent in each room can be based on, for example, image data from the video cameras throughout the property. The amount of time spent in each room can also be based on the timing of doors opening and closing between rooms.

As the visitor 222 progresses through the property 202, the monitoring server 250 can use the collected data to update a machine learning algorithm. The machine learning algorithm may include likely visitor preferences based on the visitor's age and gender. For example, the machine learning algorithm may indicate that adult males in their twenties enjoy modern pop music. The monitoring server 250 may select to play modern pop music through the speaker 236 when the visitor 222 enters the property 202. The visitor may react to the music, e.g., by saying "I don't like this song," by frowning, and/or by turning the speaker 236 volume down or off. Sensors can send data indicating the visitor's reaction to the music to the monitoring server 250. The monitoring server 250 can update the machine learning algorithm based on the visitor's negative reaction to the music. Over time, the monitoring server 250 can improve the accuracy of the algorithm by collecting and analyzing data from multiple visitors at multiple properties.

Though described above as being performed by a particular component of system 200 (e.g., the control unit 230 or the monitoring server 250), any of the various control, processing, and analysis operations can be performed by either the control unit 230, the monitoring server 250, or another computer system of the system 200. For example, the control unit 230, the monitoring server 250, or another computer system can analyze the data from sensors. Similarly, the control unit 230, the monitoring server 250, or another computer system can control the various sensors, and/or the property automation controls, to collect data or control device operation.

FIG. 3 is a flow chart illustrating an example of a process 300 for visitor-tailored property control and configuration. Process 300 can be performed by one or more computer systems, for example, the monitoring server 150, the control unit 130, or the camera 108 of the system 100. In some implementations, some or all of the process can be performed by another computer system located at the monitored property. In some examples, the control unit 130 may perform some steps of the process 300, while the monitoring server 150 performs other steps of the process 300. In some examples, the control unit 130 or the monitoring server 150 may perform all of the steps of the process 300

Briefly, process 300 includes receiving data indicating that a visitor is scheduled to arrive at a property at a particular time (310), at the particular time, receiving, from a camera, image data (320), based on the image data, determining a characteristic of the visitor (330), receiving, from a sensor, sensor data that indicates an attribute of the property (340), and, based on the sensor data and on the characteristic of the visitor, selecting and performing a monitoring system action (350).

In more detail, the process 300 includes receiving data indicating that a visitor is scheduled to arrive at a property at a particular time (310). The visitor can be, for example, the visitor 122 of the system 100. The visitor may schedule a time to arrive at the property, e.g., the property 102, through an internet website or a mobile application. A monitoring server can receive information that the visitor provides when scheduling the visit. For example, the visitor may provide information including the visitor's name, age, gender, and/or a photograph of the visitor. The visitor may also provide information on additional visitors of a group of visitors, e.g., the visitors 124, 126 of the group 125. The information can include the size of the group of visitors, the relationships between the visitors, and each visitor's name, age, gender, and/or a photograph.

The process 300 includes, at the particular time, receiving, from a camera, image data (320). The camera can be, for example, the video camera 108. When the visitor arrives, the camera obtains images of the visitor. The camera sends the image data to the monitoring server. The image data can include the results of video analysis performed on the images. For example, the image data can include data indicating that the visitor 122 appears to be an adult female wearing a tank top and sunglasses, and carrying a coffee mug.

In some examples, based on the data indicating that the visitor is scheduled to arrive at the property at the particular time, the system can retrieve, at or before the particular time, and from a database of visitor profiles, a stored profile for the visitor. For example, the control unit 230 may receive data indicating that the visitor 222 is scheduled to arrive at noon. At or before noon, the control unit 230 can retrieve the visitor profile 252 from a database of profiles stored by the control unit 230 or the monitoring server 250.

The stored profile for the visitor can include data indicating at least one of a preference of the visitor, demographic information of the visitor, or a reaction of the visitor to a property previously visited by the visitor. For example, the visitor profile 252 indicates a preference of the visitor 222 for cool temperatures. The visitor profile 252 also includes demographic information indicating that the visitor 222 is a twenty-five year old male. The visitor profile 252 also includes data indicating that the visitor's priority is bathrooms, based on a reaction of the visitor 222 to a property previously visited by the visitor 222.

The system may determine, based on the image data and the stored profile, that a person arriving at the property at or near the particular time is the visitor. For example, at or near noon, the camera 210 may capture images of an adult male arriving the property 202. The camera 210 can generate image data indicating that the camera is capturing images of an adult male. The control unit 230 can receive the image data from the camera 210. Based on the image data indicating the adult male, and the stored visitor profile 252 indicating that the visitor 222 is a twenty-five year old male, the control unit 230 can determine that the person arriving at the property 202 at or near noon is the visitor 222.

The process 300 includes, based on the image data, determining a characteristic of the visitor (330). The characteristic of the visitor may include one or more of an age, gender, apparel, accessory, or mode of transportation of the visitor. The monitoring server can analyze the image data to determine a characteristic of the visitor that may indicate the visitor's likely preferences for temperature, lighting, scent, and/or sound. In some examples, the camera 210 or the control unit 230 may analyze the image data to determine the characteristic of the visitor. For example, the camera 210, the control unit 230, or the monitoring server 250 may analyze the image data to determine a characteristic of the visitor 222 that the visitor is greater than six feet tall.

In some examples, the system can add, to a stored profile for the visitor, the characteristic of the visitor. For example, the system can add, to a stored profile for the visitor 222, the characteristic that the visitor 222 is greater than six feet tall. The profile may be stored, for example, by the control unit 130 or the monitoring server 250.

In some examples, the process can include generating a profile of the visitor including the characteristic of the visitor, and storing the profile of the visitor in a database of visitor profiles. For example, the system may generate a profile of the visitor 222, including the characteristic that the visitor 222 is greater than six feet tall. The system can store the profile of the visitor in a database stored, e.g., by the control unit 230 or the monitoring server 250.

In some examples, the process can include determining, based on the image data, a characteristic of a group of visitors that includes the visitor and at least one other visitor. For example, the system may analyze image data from images of the group 125, including the visitor 122 and additional visitors 124, 126. Based on analyzing the image data, the system may determine a characteristic of the group 125 that the group 125 is a family of three that includes a school-age child.

The process 300 includes receiving, from a sensor, sensor data that indicates an attribute of the property (340). The sensor can include, for example, a thermometer, a microphone, a camera, a motion sensor, etc. The attribute of the property can include one or more of a status of an appliance, a lighting level, a sound level, a temperature, or a scent at the property. The monitoring server can receive data from a sensor indicating, for example, the temperature and lighting levels of the property. The monitoring server can receive data from a sensor indicating the status of certain devices and/or appliances, such as whether an appliance is on or off. For example, the monitoring server can receive data from an indoor thermometer indicating that the indoor temperature is 75 degrees. The monitoring server can also receive data from a window blind controller indicating that the window blinds are open, and from a coffee maker indicating that the coffee maker is off. The monitoring server can also receive data from a sound speaker, indicating a type of sound being broadcast at the property. The monitoring server can also receive data from a scent-maker, e.g., an air freshener, indicating a type of scent being produced at the property.

The process 300 includes, based on the sensor data and on the characteristic of the visitor, selecting and performing a monitoring system action (350). Selecting and performing the monitoring system action can include classifying, based on the characteristic of the visitor, the visitor into a category of visitors. For example, based on the characteristic that the visitor 222 is greater than six feet tall, the system can classify the visitor 222 into a category of "tall" visitors.

The system can identify property settings preferred by the category of visitors. Identifying the property settings preferred by the category of visitors can include accessing a database of property settings preferred by multiple categories of visitors. For example, the system may access a database stored by the monitoring server 250. The database can include property settings preferred by multiple categories of visitors, including the "tall" category of visitors. The database may include, for example, data indicating that visitors in the "tall" category generally prefer warmer temperatures of greater than seventy degrees Fahrenheit.

The system can determine, based on the sensor data, that a property setting is different from the property settings preferred by the category of visitors. For example, the system may determine that the temperature setting of the property 202 is at a cooler temperature of less than seventy degrees Fahrenheit, and that the "tall" category of visitors prefer warmer temperatures of greater than seventy degrees Fahrenheit. Thus, the system can determine that the temperature setting of the property 202 is different from the temperature setting preferred by the "tall" category of visitors.

The system can adjust the property setting to align the property setting with the property settings preferred by the category of visitors. For example, the system can adjust the temperature setting of the property 202 to align with the temperature setting preferred by the "tall" category, e.g., by raising the temperature setting of the property 202 from less than seventy degrees Fahrenheit to greater than seventy degrees Fahrenheit.

Selecting and performing the monitoring system action can include determining, based on the characteristic of the visitor, a likely preference of the visitor. Determining the likely preference of the visitor can include providing the characteristic of the visitor as input to a machine learning model that has been trained to determine likely preferences corresponding to visitor characteristics. For example, the system can provide the characteristic that the visitor 222 is greater than six feet tall as input to a machine learning model, e.g., that is stored by the monitoring server 250.

The system can receive an output from the machine learning model that indicates the likely preference of the visitor. The system can determine, based on the received output from the machine learning model, the likely preference of the visitor. For example, the system can receive output from the machine learning model that indicates a likely preference of the visitor 222 for baking scents. The system can determine, based on the received output from the machine learning model, that the visitor 222 likely prefers baking scents.

The system can determine that the sensor data indicates an attribute of the property that is different from the likely preference of the visitor. For example, the system may determine that an air freshener at the property 202 is releasing a woody scent, and thus the scent attribute of the property 202 is different from the likely preference of the visitor 222 for baking scents.

Based on determining that the sensor data indicates the attribute of the property that is different from the likely preference of the visitor, the system can adjust the attribute of the property to align the attribute of the property with the likely preference of the visitor. For example, based on determining that the scent attribute of the property 202 is different from the likely preference of the visitor 222, the system can adjust the scent attribute of the property 202. The system can, for example, switch the air freshener at the property 202 from releasing the woody scent to releasing a baking scent.

The monitoring server can select and perform a monitoring system action, for example, based on pre-programmed rules or a machine learning algorithm. System actions can include, for example, sending a command to a control unit to reconfigure an appliance or device at the property. For example, the monitoring server can send a command to the control unit to lower a thermostat setting using automation controls. The monitoring server can also send a command to the control unit to lower the window blinds, and to the coffee maker to turn on.

In some examples, the system can receive, from a second sensor at the property, second sensor data indicating a reaction of the visitor to the property. The system can store, in the database of property settings, the property setting and the data indicating the reaction of the visitor to the property. For example, the second sensor may be an indoor camera, e.g., camera 214 installed in the living room of property 202. The system may receive, from the camera 214, image data indicating a reaction of the visitor 222 donning a sweatshirt upon entering the property 202. The system can store, in the database of property settings, the temperature of the property 202 and the data indicating that the visitor 222 donned the sweatshirt upon entering the property 202.

In some examples, the system can receive, through a user interface presented to the visitor by a computing device, user input data indicating a reaction of the visitor to the property. The system can store, in the database of property settings, the property setting and the user input data indicating the reaction of the visitor to the property. For example, during or after the visit, the visitor 222 may provide feedback on the property 202, e.g., through a post-visit survey presented to the visitor 222 through an application on a computing device associated with the visitor 222. The visitor 222 may input data indicating that the property 202 was too cold. The system can store, in the database of property settings, the temperature of the property and the user input data indicating the visitor's reaction that the property 202 was too cold.

In some examples, the system can determine, based on the image data, a characteristic of a second visitor. The system can determine, based on the characteristic of the second visitor, a likely preference of the second visitor that is different from the likely preference of the first visitor. For example, the visitor 222 may arrive with a second visitor. The second visitor can determine, based on the image data, a characteristic of the second visitor that the second visitor has long hair. The system may determine, based on the characteristic of the second visitor that the second visitor has long hair, a likely preference of the second visitor for cooler temperatures less than sixty-five degrees Fahrenheit. Thus, the system can determine that the likely preference of the second visitor for cooler temperatures is different from the likely preference of the first visitor for warmer temperatures.

Selecting and performing a monitoring system action can include classifying the first visitor as a lead visitor. For example, the system may classify the first visitor, e.g., visitor 222, as the lead visitor based on the visitor 222 having scheduled the visiting appointment.

The system may determine that the sensor data indicates an attribute of the property that is different from the likely preference of the first visitor and is different from the likely preference of the second visitor. For example, the system may determine that a temperature of a property is sixty-seven degrees Fahrenheit, and is different from the likely preference of the first visitor of greater than seventy degrees Fahrenheit and from the likely preference of the second visitor of less than sixty-five degrees Fahrenheit Based on determining that the sensor data indicates the attribute of the property that is different from the likely preference of the first visitor and is different from the likely preference of the second visitor, and in response to classifying the first visitor as the lead visitor, the system can adjust the attribute of the property to align the attribute of the property with the likely preference of the first visitor. For example, based on determining that the temperature of the property 202 is different from the likely preference of the first visitor and from the likely preference of the second visitor, the system can adjust the temperature of the property 202 to align the temperature of the temperature of the property 202 with the likely preference of the first visitor. For example, the system can adjust the temperature of the property 202 to a temperature greater than seventy degrees Fahrenheit to align with the likely preference of the first visitor.

In some examples, the process can include, based on the sensor data and on a characteristic of the group of visitors, selecting and performing the monitoring system action. Selecting and performing the monitoring system action can include classifying, based on the characteristic of the group of visitors, the group into a category of groups. For example, based on the characteristic of the group 125 that the group 125 is a family of three that includes a school-age child, the system can classify the group 125 into a category of "families with school-age children."

The system can identify property settings preferred by the category of groups. For example, the system can identify property settings preferred by the group category of "families with school-age children." The property settings preferred by this category may include, for example, sounds of upbeat music.

The system can determine, based on the sensor data, that a property setting is different from the property settings preferred by the category of groups. For example, the system may determine, based on the sensor data, that the speaker 146 at the property 102 is playing mellow music. The system can determine that the speaker 146 playing mellow music is different from the property setting of upbeat music that is preferred by the category of "families with school-age children."

The system can adjust the property setting to align the property setting with the property settings preferred by the category of groups. For example, the system can adjust the speaker 146 to play upbeat music instead of mellow music, to align the property sounds with the preferred settings of the category of "families with school-age children."

In some examples, the process can include receiving, from a second monitoring system of a second property, data representing an interaction of the visitor with the second property. For example, prior to visiting the property 202, the visitor 222 may have visited a second property. At the second property, the visitor 222 may have turned on multiple lights as the visitor 222 walked through the second property. The monitoring system of the property 202 may receive, from a second monitoring system of the second property, data indicating that the visitor 222 turned on the lights at the second property.

The process can include determining, based on the data representing the interactions of the visitor with the second property, a likely preference of the visitor. Based on the likely preference of the visitor, the system can perform the monitoring system action. For example, based on the data indicating that the visitor 222 turned on the lights at the second property, the system may determine a likely preference of the visitor 222 for bright lighting. Based on the likely preference of the visitor 222 for bright lighting, the system can perform a monitoring system action of increasing a brightness of lights at the property 202.

Figure 4:
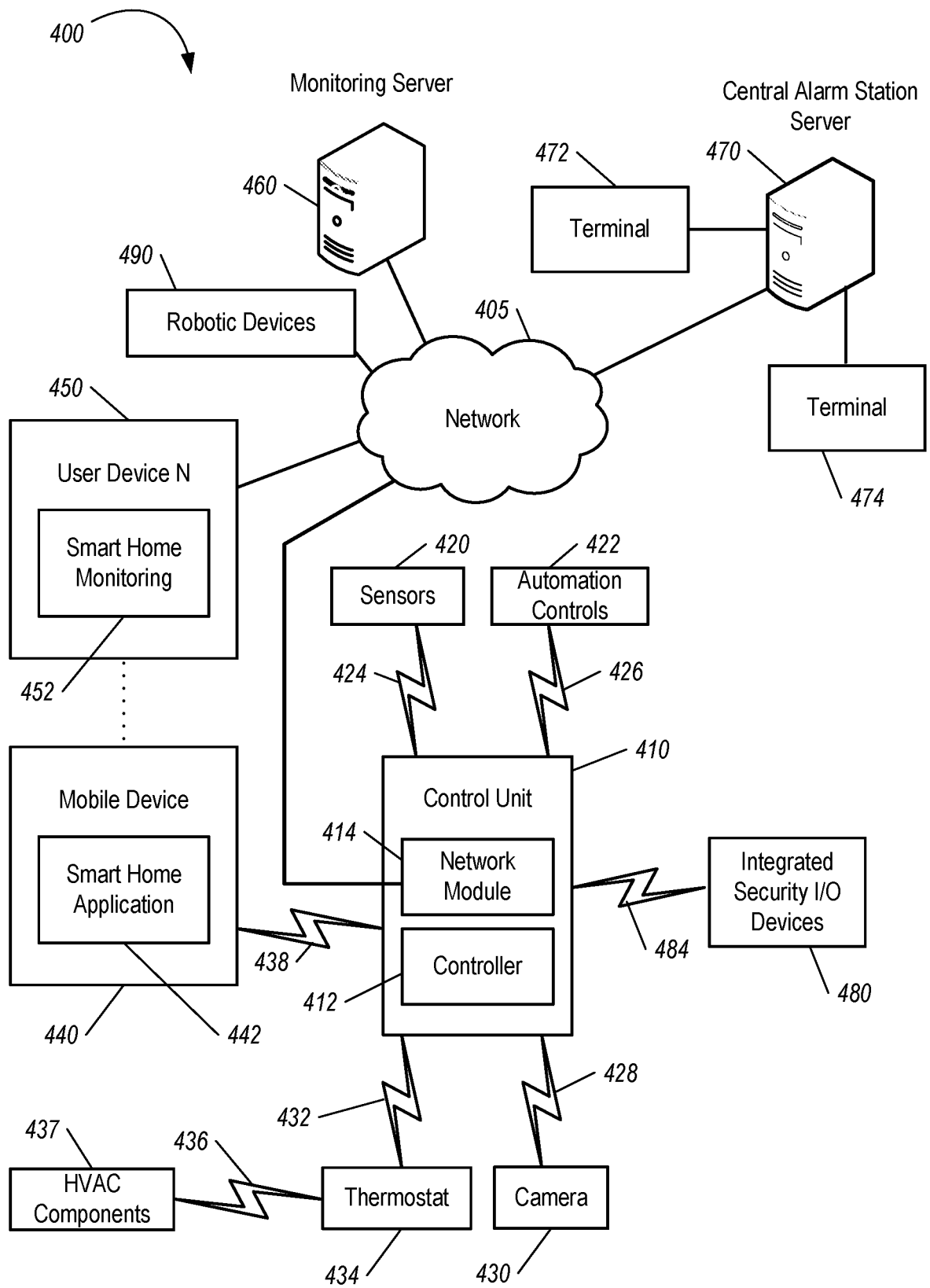
FIG. 4 is a diagram illustrating an example of a property monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400. For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method, comprising:
classifying a visitor to a property into a particular category of visitors;
adjusting at least one device at the property to align a property attribute with a setting determined to likely be preferred by the particular category of visitors;
receiving, from a sensor at the property, image data depicting the visitor and indicating a reaction of the visitor to the property; and
storing, in a database of preferences of multiple categories of visitors, data indicating (i) the setting of the property attribute and (ii) the reaction of the visitor to the property.

2. The method of claim 1, comprising:
classifying the visitor into the particular category of visitors using a characteristic of the visitor determined using one or more images depicting the visitor.

3. The method of claim 2, wherein the characteristic of the visitor includes one or more of an age, gender, apparel, accessory, family status, or mode of transportation of the visitor.

4. The method of claim 2, comprising:
accessing schedule data indicating an appointment for a scheduled visit to the property, wherein the appointment is associated with a particular time range and a profile of a particular user;
receiving, within the particular time range and from a camera, the one or more images depicting the visitor;
determining, based at least in part in part on receiving the one or more images within the particular time range, that the visitor is the particular user; and
classifying the visitor into the particular category of visitors using the profile of the particular user.

5. The method of claim 1, comprising retrieving, from a database of preferences of multiple categories of visitors, the setting of the property attribute determined to likely be preferred by the particular category of visitors.

6. The method of claim 1, comprising:
generating a profile i) of the visitor ii) that identifies the particular category of visitors into which the visitor is classified; and
storing the profile of the visitor in a database of visitor profiles.

7. The method of claim 1, wherein:
the setting of the property attribute determined to likely be preferred by the particular category of visitors comprises a particular type of sound; and
adjusting the at least one device at the property to align the property attribute with the setting preferred by the particular category of visitors comprises adjusting at least one audio speaker at the property to output the particular type of sound.

8. The method of claim 1, wherein:
the setting of the property attribute determined to likely be preferred by the particular category of visitors comprises a particular range of temperatures; and
adjusting the at least one device at the property to align the property attribute with the setting preferred by the particular category of visitors comprises adjusting at least one thermostat at the property to the particular range of temperatures.

9. The method of claim 1, wherein:
the setting of the property attribute determined to likely be preferred by the particular category of visitors comprises a particular brightness of lighting; and
adjusting the at least one device at the property to align the property attribute with the setting preferred by the particular category of visitors comprises adjusting at least one light at the property to the particular brightness of lighting.

10. A method comprising:
obtaining, using a camera, image data depicting a group of visitors to a property;
determining, by one or more processors coupled to the camera and using the image data, a characteristic of the group of visitors;
determining, by the one or more processors and using the characteristic of the group of visitors, a setting of a property attribute determined to likely be preferred by the group of visitors;
adjusting, by the one or more processors, at least one device at the property to align the property attribute with the setting determined to likely be preferred by the group of visitors; and
receiving, from a sensor at the property, image data depicting at least one person in the group of visitors and indicating a reaction of the person to the property; and
storing, in a database of preferences of multiple categories of visitor groups, data indicating (i) the setting of the property attribute and (ii) the reaction of the person to the property.

11. The method of claim 10, wherein determining the setting of the property attribute determined to likely be preferred by the group of visitors comprises:

classifying the group of visitors into a particular category of visitor groups using the characteristic of the group of visitors; and
determining the setting of the property attribute determined to likely be preferred by the particular category of visitor groups.

12. The method of claim 11, wherein determining the setting of the property attribute determined to likely be preferred by the particular category of visitor groups comprises:
retrieving, from the database of preferences of multiple categories of visitor groups, the setting of the property attribute determined to likely be preferred by the particular category of visitor groups.

13. The method of claim 10, wherein:
the group of visitors includes at least a first visitor and a second visitor,
determining the characteristic of the group of visitors comprises classifying the first visitor as a lead visitor of the group of visitors, and
determining the setting of the property attribute determined to likely be preferred by the group of visitors comprises determining the setting of the property attribute determined to likely be preferred by the lead visitor.

14. The method of claim 13, wherein classifying the first visitor as the lead visitor of the group of visitors comprises:
accessing schedule data indicating appointments for scheduled visits to the property, wherein each appointment is associated with a user profile;
identifying a particular appointment for a scheduled visit by the group of visitors; and
classifying the first visitor as the lead visitor in response to determining that the first visitor corresponds to the user profile that is associated with the particular appointment.

15. The method of claim 10, wherein the characteristic of the group of visitors includes one or more of an age, gender, apparel, accessory, family status, or mode of transportation of the group of visitors.

16. The method of claim 10, wherein the property attribute includes one or more of a status of an appliance, a furniture arrangement, a lighting level, a sound level, or a temperature at the property.

17. A non-transitory computer-readable medium storing software comprising instructions executable by one or more computers which, upon such execution, cause the one or more computers to perform operations comprising:
classifying a visitor to a property into a particular category of visitors;
adjusting at least one device at the property to align a property attribute with a setting determined to likely be preferred by the particular category of visitors;
receiving, from a sensor at the property, image data depicting the visitor and indicating a reaction of the visitor to the property; and
storing, in a database of preferences of multiple categories of visitors, data indicating (i) the setting of the property attribute and (ii) the reaction of the visitor to the property.

* * * * *